US007487184B1

(12) United States Patent
Barrett-Lennard

(10) Patent No.: US 7,487,184 B1
(45) Date of Patent: Feb. 3, 2009

(54) METHOD, SYSTEM, AND COMPUTER PROGRAM PRODUCT FOR IMPROVED ROUND ROBIN FOR TIME SERIES DATA

(75) Inventor: Michael Barrett-Lennard, Swan View (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/117,816

(22) Filed: May 9, 2008

(51) Int. Cl.
*G06F 17/40* (2006.01)
(52) U.S. Cl. .................................. 707/104.1; 707/100
(58) Field of Classification Search ................ 707/100, 707/104.1
See application file for complete search history.

(56) References Cited

U.S. PATENT DOCUMENTS

| | | | | |
|---|---|---|---|---|
| 6,609,085 | B1 * | 8/2003 | Uemura et al. ............... | 702/189 |
| 7,225,178 | B2 | 5/2007 | Shimokawa et al. | |
| 2002/0103965 | A1 * | 8/2002 | Dawkins et al. ............. | 711/113 |
| 2006/0269148 | A1 | 11/2006 | Farber et al. | |
| 2007/0294247 | A1 | 12/2007 | Papadimitriou et al. | |

OTHER PUBLICATIONS

Ajtai et al., Compactly Encoding Unstructured Inputs with Differential Compression, Journal of the ACM, vol. 49, No. 3, pp. 318-367, May 2002.

* cited by examiner

*Primary Examiner*—Don Wong
*Assistant Examiner*—Angela M Lie
(74) *Attorney, Agent, or Firm*—Keusey, Tutunjian & Bitetto, P.C.

(57) ABSTRACT

A method, system, and computer program product are provided for improved round robin for time series data. The method includes receiving user inputs specifying a time period and a sample rate for collection of delta samples. Each delta sample represents a difference between two subsequent values of the time series data. The method further includes accumulating the delta samples over the time period in accordance with the sample rate, calculating a field size based on a maximum one of the delta samples, and writing the delta values to the database using the calculated field size. The database is relatable to a plurality of records. Each record corresponds to a respective time period for delta sample collection and has an adjustable field size for delta sample storage based on a maximum delta sample value for the respective time period.

1 Claim, 4 Drawing Sheets

METHOD, SYSTEM, AND COMPUTER PROGRAM PRODUCT FOR IMPROVED ROUND ROBIN FOR TIME SERIES DATA

BACKGROUND

1. Technical Field

The present invention relates to a method, system, and computer program product for improved round robin for time series data.

2. Description of the Related Art

The technique of using a round robin database to store time series data is already well established. Such a technique includes advantages relating to storage efficiency, size limitations, and read speed. For example, with respect to storage efficiency, only the data is stored, with timestamps being defined by position in the file. With respect to size limitations, the size of the database file never grows above its initial size. Thus, when we reach the end of the file we start at the beginning again. With respect to read speed, reading sequential values of the series is a matter of reading the file where the values are stored in order.

Nonetheless, there is a need to improve the technique of using a round robin database to store time series data.

SUMMARY

The shortcomings of the prior art are overcome and additional advantages are provided through the provision of a method, system, and computer program product for improved round robin for time series data.

According to an aspect of the present principles, there is provided a method for storing time series data in a database using round robin. The method includes receiving user inputs specifying a time period and a sample rate for collection of delta samples. Each of the delta samples represents a difference between two subsequent values of the time series data. The method further includes accumulating the delta samples over the time period in accordance with the sample rate, calculating a field size for storing the delta samples for the time period based on a maximum one of the delta samples, and writing the delta values to the database using the calculated field size. The database is relatable to a plurality of records. Each of the plurality of records corresponds to a respective one of a plurality of time periods for delta sample collection and has an adjustable field size for delta sample storage based on a maximum delta sample value for the respective one of the plurality of time periods.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
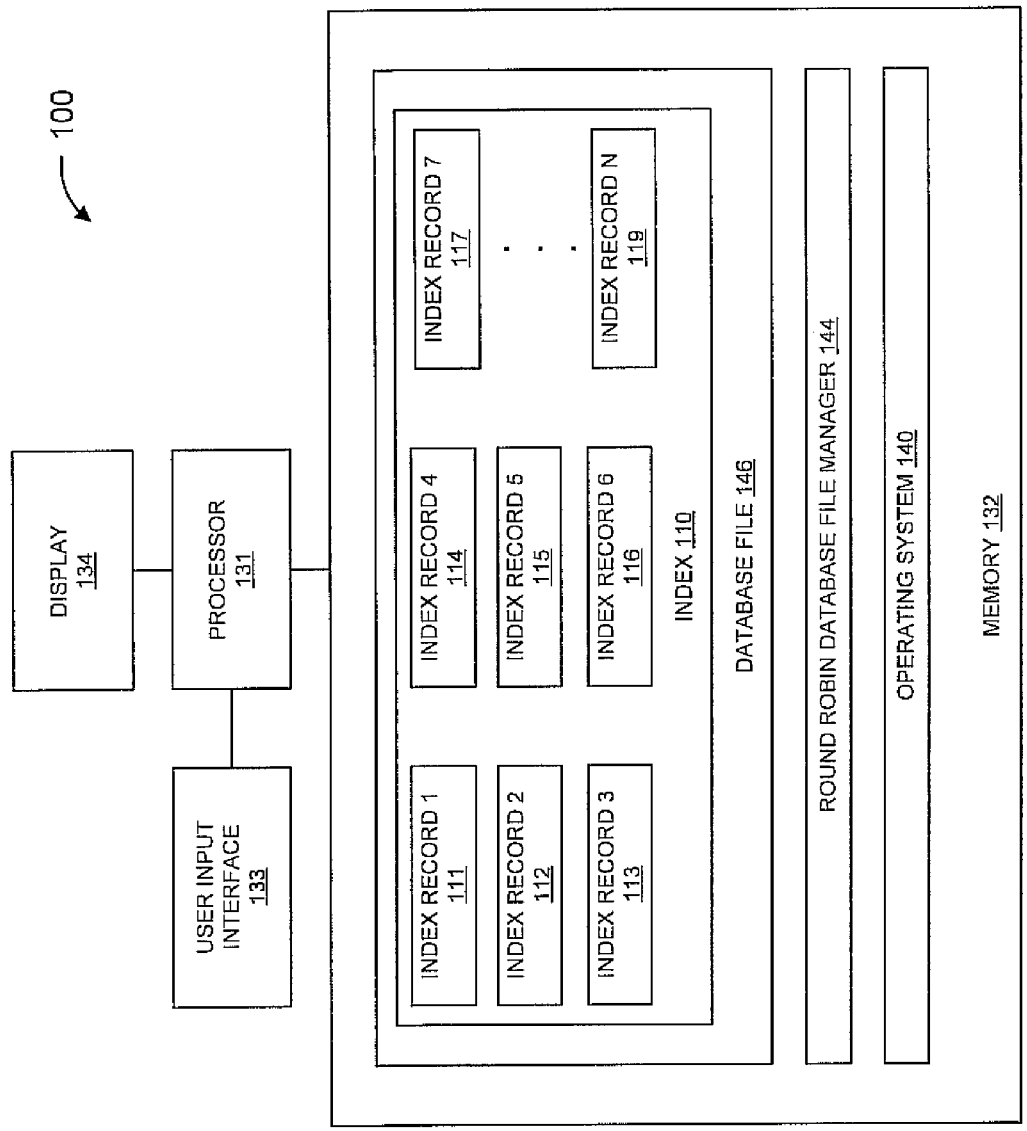
FIG. 1 illustrates an exemplary system having round robin database storage capabilities, according to an embodiment of the present principles.

Referring now in detail to the figures in which like numerals represent the same or similar elements and initially to FIG. 1, an exemplary system having round robin database storage capabilities is indicated generally by the reference numeral 100.

System 100 may represent practically any type of computer, computer system or other programmable electronic system. System 100 may be connected to a network or may be a stand-alone system in the alternative.

System 100 includes a processor 131 that is connected to a memory unit 132, user input interface component 133 and display 134. System 100 can be connected to other devices via wired and/or wireless links. It is to be noted that system 100 can be characterized by a centralized architecture but that it can also be characterized by a distributed architecture. Accordingly, the various components of system 100 can be located near each other, but this is not necessarily so.

User input interface component 133 can be a keyboard, a mouse, a joystick, a touchpad, a microphone, a gesture recognition device, or a combination thereof. It is to be noted that, depending upon the embodiment, some of the above mentioned components may be optional.

According to a first embodiment of the invention, system 100 operates under the control of operating system 140, and executes various computer software applications, components, programs, objects, modules, and so forth, such as but not limited to round robin database file manager 144.

Conveniently, system 100 can be controlled by multiple operating systems that in turn are monitored by a hypervisor. For simplicity of explanation, FIG. 1 illustrates a single operating system.

For simplicity of explanation it is assumed that round robin database file manager 144 is used to manage the round robin storage of time series data in a database file 146 (or other storage structure).

Figure 2:
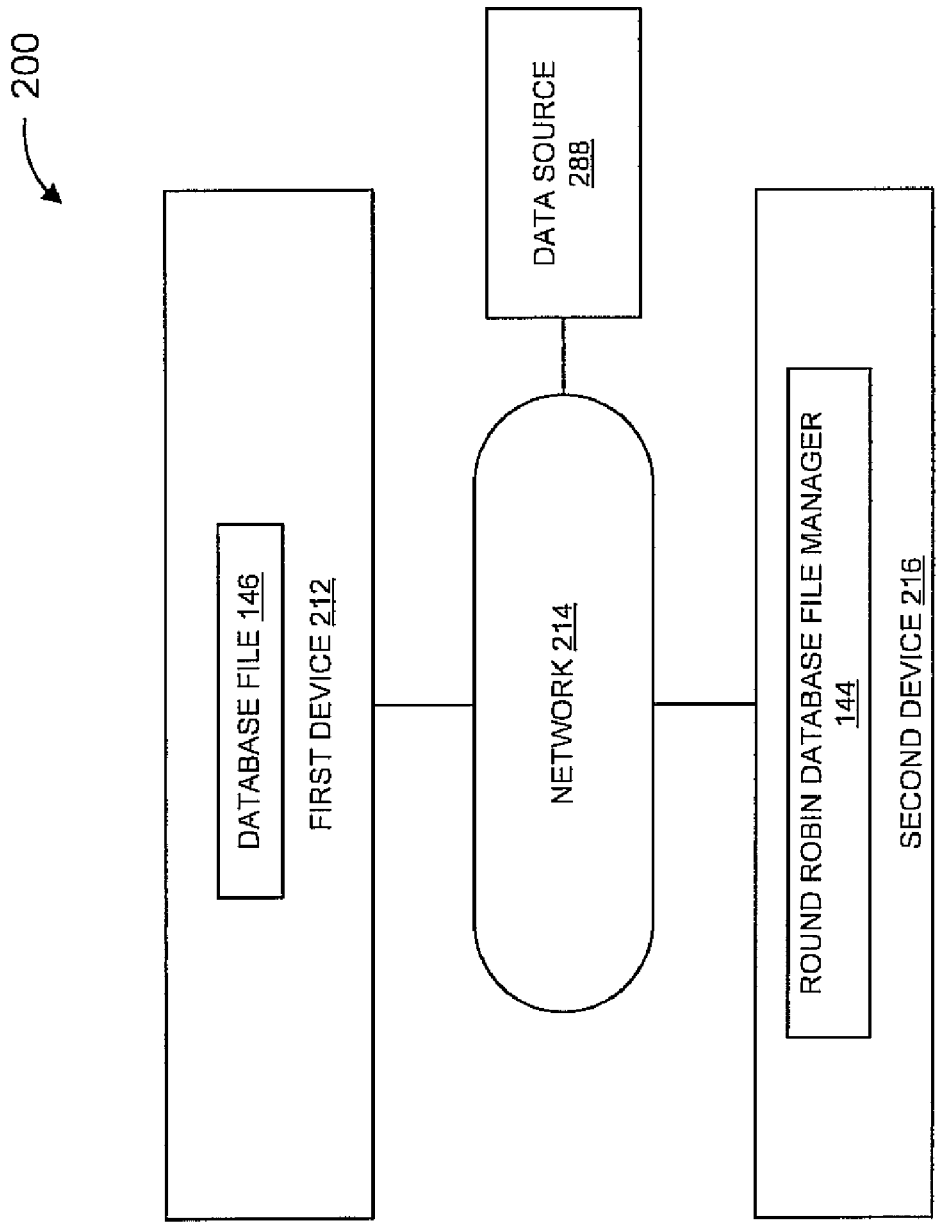
FIG. 2 illustrates another exemplary system having round robin database storage capabilities, according to an embodiment of the present principles.

According to another embodiment of the invention, round robin database file manager 144 and database file 146 (the latter, to which round robin database file manager 144 may be applied) are stored at different devices, as illustrated in FIG. 2. Referring to FIG. 2, another exemplary system having round robin database storage capabilities is indicated generally by the reference numeral 200. In system 200, second device 216 can receive time series data for storage from a data source device 288 (which may be a third device as shown, or one or more of the first or second devices). Second device can 216 can then execute round robin database file manager 144 to manage the storage of the time series data as described in further detail herein. The results of the management (including, for example, the fields in the respective index records and/or any corresponding data (delta samples) that may be added/removed and so forth to/from the database file 146) can be sent, over network, 214, to first device 212. It is noted that first device 212 and second device 216 can include additional components such as a display, a user input interface, a processor, a memory and that they can store an operating system and executable programs.

Referring back to FIG. 1, the execution of round robin database file manager 144 can be triggered in response to a user request, can be triggered in response to an occurrence of one or more certain events, or can be triggered in view of a combination of both.

Figure 3:
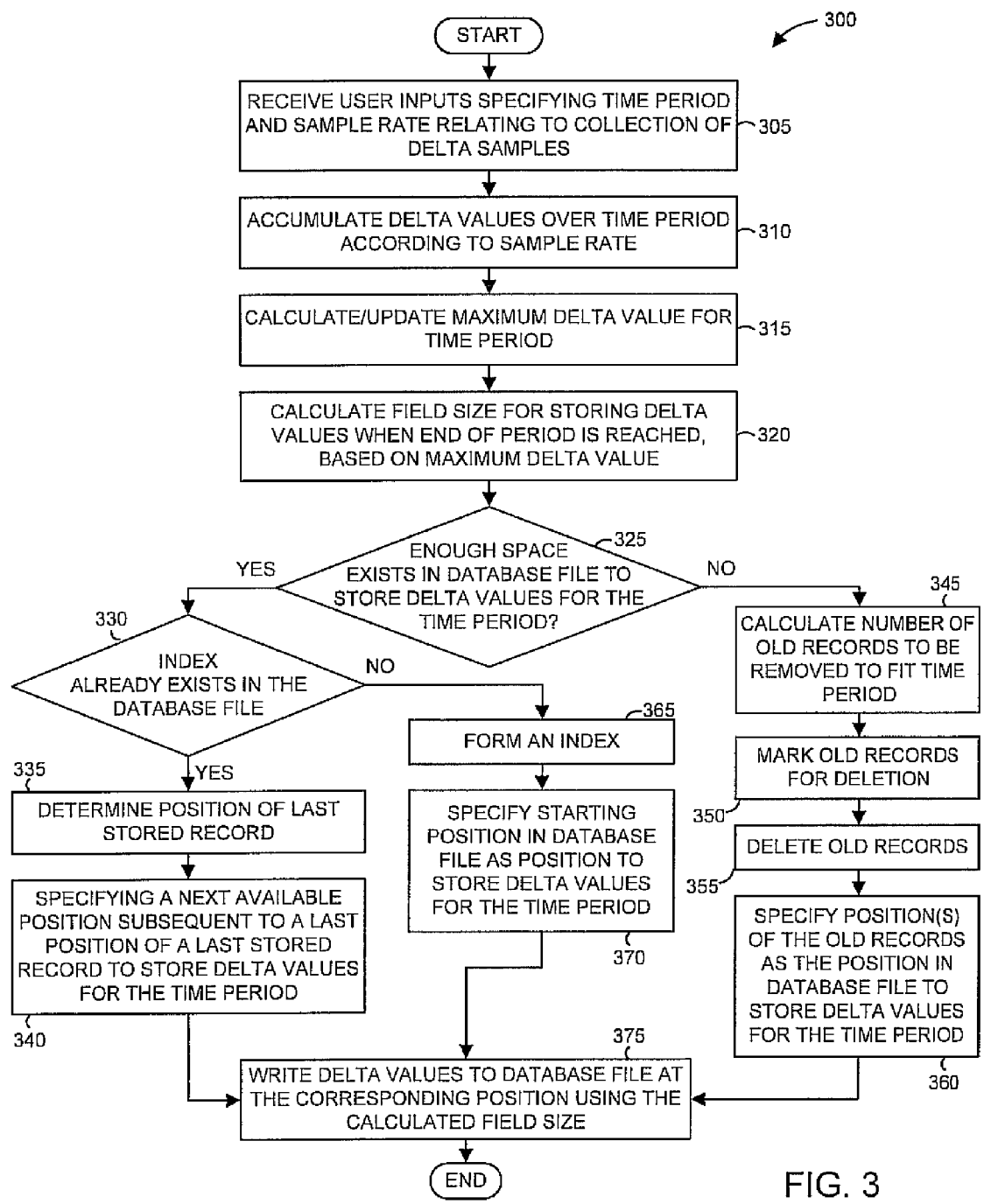
FIG. 3 illustrates an exemplary method for writing time series data to a database file using a round robin technique, according to an embodiment of the present principles.

FIG. 3 is a flow chart of method 100 for writing time series data to a database file using a round robin technique, according to an embodiment of the present principles.

The method 300 includes receiving user inputs specifying a time period and a sample rate relating to the collection of delta samples (to be stored in database file 146) at step 305. The delta samples represent a difference between two subsequent sample values of the time series data.

At step 310, the delta values are accumulated over the time period according to the sample rate.

At step 315, a maximum delta value for the period is calculated and/or updated. It is to be appreciated that step 315 may be performed while the delta values are being accumulated per step 310 or after the accumulation.

At step 320, when the end of the period is reached, the absolute maximum delta value is used to calculate the size of the fields to be used to store the delta values in the database file 146 (for the given period as specified per step 305, since each period will have a different field size depending on the maximum delta value during that period).

At step 325, it is determined whether or not enough space currently exists in the database file 146 to store delta values for the time period specified per step 305. If so, then control is passed to step 330. Otherwise, control is passed to step 345.

At step 330, it is determined whether or not an index already exists in the database file 146. If so, then control is passed to step 335. Otherwise, control is passed to step 365.

At step 335, the position of the last stored index record is determined.

At step 340, a next available position subsequent to a last position of the last stored index record is specified as the position to begin storing the delta values for the current time period (per step 305) thereat.

At step 365, an index is formed, with each record in the index representing a stored period. An index record may include, for example, one or more of the following fields: position; field width; period time; start value; and deletion flag.

At step 370, the starting position in the database file 146 is specified as the position to begin storing the delta values for the current time period (per step 305), given the lack of any existing records in the database file.

At step 345, the number of old (preferably oldest in chronological order) records in the database file 146 that need to be removed to fit the new time period (per step 305) is calculated.

At step 350, the old records used in the calculation per step 345 are marked for deletion (as indicated by the deletion flag field).

At step 355, the old records marked for deletion are deleted.

At step 360, the position (for example, the starting position (s)) of the old records used in the calculation per step 345 is specified as the position in the database file to store the delta values for the current time period (per step 305).

At step 375, the delta values are written to the database file at the corresponding position (specified per step 340 or step 360 or step 370) using the calculated field size (per step 320).

Figure 4:
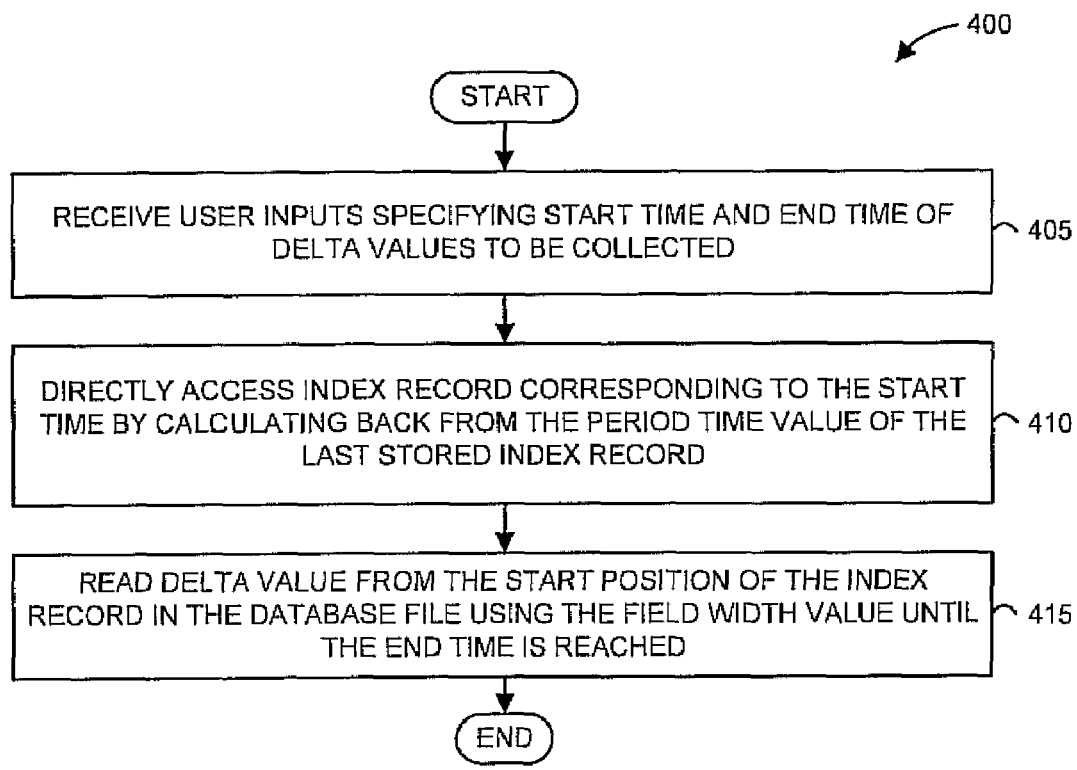
FIG. 4 illustrates an exemplary method for reading time series data from a database file, where the data was initially written to the database file using a round robin technique, according to an embodiment of the present principles.

FIG. 4 is a flow chart of method 400 for reading time series data to a database file, where the data was initially written to the database file using a round robin technique, according to an embodiment of the present principles.

The method 400 includes receiving user inputs specifying a start time and an end time of the delta values to be collected at step 405.

At step 410, the index record corresponding to the provided start time (per step 405) is directly accessed by calculating back from the period time value (as indicated in the period time value field) of the last stored index record.

At step 415, delta values are read from the start position (as indicated in the start position field) of the corresponding index record in the database file 146 using the field width value (specified in the field width field) until the end time (specified per step 405) is reached.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk - read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As used herein, the word "managing" as used with respect to the round robin storage of data (e.g., time series data) in a database (e.g., a database file), refers to one or more of adding, deleting, modifying, and so forth data values (e.g., delta values) to/from/in the database, forming, deleting, modifying, and so forth an existing index record in accordance with the present principles.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The present principles are directed to the round robin storage of data. Advantageously, in an embodiment, the storage efficiency of round robin data storage is increased. Read and/or write speed may be slightly affected in order to obtain the increase in storage efficiency.

Time series data follows patterns for which we can derive heuristics. Such derived heuristics include, for example, any of the following: the difference of two subsequent sample values is typically smaller than the sample value; spikes in time series data occurs in bursts; and typically, changes in time series data are gradual. Based on the presumption that these heuristics are true, we provide a storage method that takes advantage of these patterns that will store the data more efficiently.

For example, based on the presumption that these heuristics are true, then it makes sense to store the difference between samples, rather than the sample value itself. The size of these values will be generally smaller so less space is needed to store them.

Generally, in databases all values have the same size for efficient access. The field is made large enough to store any conceivable value (32 bits is common with a max value of +/−2147483647). Most of the bits in these fields are not significant and are wasted.

A more efficient solution is to collect delta samples over a period of time before adding them to the data base. In that way, the maximum possible size is known and the field size can be adjusted accordingly. For example, if the sample time was every minute then the period might be a day, resulting in 3600 samples collected for the period. As sample deltas are stored, a maximum delta value for the period is updated. Once the end of a period is reached the absolute maximum delta value is used to calculate the size of the fields, e.g., if the absolute maximum delta was 112 then the field size would need to be 8 bits (+/−127). The samples for this period are stored in the database file using 8 bit fields.

Each period will have a different field size depending on the maximum delta value during the period. The delta samples for the period need to be written to the database file. The position to write the delta samples is calculated using an index, with each record in the index representing a stored period. An index record includes the following fields: a position field; a field width field; a period time field; a start value field; and a deletion flag field. The value of the position field indicates the position in a file of the period. The value of the field width field indicates the number of bits for each field. The value of the period time field indicates the start time of the period. The value of the start value field indicates an initial sample value. The value of the deletion flag indicates whether or not the particular record is marked for deletion.

The position of the last stored index record is persistent. By reading the last stored index record, the position in the archive to store sample values for a currently specified time period can be calculated.

Access to values in the database involves specifying the start and end time of the samples to collect, i.e., the start time and the end time. The start time's index record is accessed directly by calculating back from the last stored index record's time period time. This is because each index record represents a fixed length of time.

First a starting sample value is needed. From the start position in the database file deltas are read using the field width and applied to the start value until the start time is reached.

Now with a starting value, the sample values in the period to up to the end time can be generated. If the end of a period is reached, then the next index record is read. Now it is possible to proceed with a new field width value, and so on until the end time is reached.

The database can be limited to only grow to a preset size. Before a period is written to the end of the database file, the size of the database file is calculated. A check is performed to make sure the size of the database file does not exceed the maximum size if the period is added.

If the maximum size of the database file is exceeded, then the following is performed: calculate how many of the oldest index records at the beginning of the database file need to be removed to fit in the new period; mark those index records for deletion; and write the current period samples to where those deleted periods were from the start of the file.

From now on, whenever a new period of samples is written to the database, zero or more of the oldest index records will need to marked for deletion. In the database the new period will be written to the end of where the last period finished. This means the database will store data over a variable length of time depending on how much the time series data fluctuates.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for storing time series data in a database using round robin, comprising:
  receiving user inputs specifying a time period and a sample rate for collection of delta samples, each of the delta samples representing a difference between two subsequent values of the time series data;
  accumulating the delta samples over the time period in accordance with the sample rate;

calculating a field size for storing the delta samples for the time period based on a maximum one of the delta samples; and writing the delta values to the database using the calculated field size, the database being relatable to a plurality of records, each of the plurality of records corresponding to a respective one of a plurality of time periods for delta sample collection and having an adjustable field size for delta sample storage based on a maximum delta sample value for the respective one of the plurality of time periods.

* * * * *